(12) United States Patent
Chou et al.

(10) Patent No.: US 8,537,645 B1
(45) Date of Patent: Sep. 17, 2013

(54) NEAR FIELD LIGHT GENERATING ELEMENT, THERMALLY ASSISTED MAGNETIC HEAD, THERMALLY ASSISTED MAGNETIC HEAD DEVICE AND THERMALLY ASSISTED MAGNETIC RECORDING/REPRODUCING APPARATUS

(75) Inventors: Tsutomu Chou, Tokyo (JP); Koji Shimazawa, Tokyo (JP); Shinji Hara, Tokyo (JP); Eiji Komura, Tokyo (JP); Ryo Hosoi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/530,829

(22) Filed: Jun. 22, 2012

(51) Int. Cl.
*G11B 11/00* (2006.01)

(52) U.S. Cl.
USPC .......... 369/13.24; 369/13.33; 369/13.37; 369/13.14

(58) Field of Classification Search
None
See application file for complete search history.

(56) References Cited

U.S. PATENT DOCUMENTS

| 6,768,556 B1 | 7/2004 | Matsumoto et al. | |
| 8,254,215 B1 * | 8/2012 | Tanaka et al. | 369/13.33 |
| 2003/0066944 A1 | 4/2003 | Matsumoto et al. | |
| 2005/0078565 A1 | 4/2005 | Peng et al. | |
| 2011/0228419 A1 | 9/2011 | Tanaka et al. | |

FOREIGN PATENT DOCUMENTS

| JP | 2001-255254 | 9/2001 |
| JP | 4032689 | 11/2007 |
| JP | 4104584 | 4/2008 |

OTHER PUBLICATIONS

U.S. Appl. No. 13/191,913, filed Jul. 27, 2011, Chou et al.
U.S. Appl. No. 13/204,026, filed Aug. 5, 2011, Hara et al.
U.S. Appl. No. 13/297,375, filed Nov. 16, 2011, Komura et al.
U.S. Appl. No. 13/298,360, filed Nov. 17, 2011, Komura et al.
U.S. Appl. No. 13/397,041, filed Feb. 15, 2012, Chou et al.
U.S. Appl. No. 13/097,133, filed Apr. 29, 2011.

* cited by examiner

*Primary Examiner* — Muhammad N Edun
(74) *Attorney, Agent, or Firm* — Oblon, Spivak, McClelland, Maier & Neustadt, L.L.P.

(57) ABSTRACT

A near-field light generating element includes a plasmon generator, and the plasmon generator has a base plate and a protrusion. The protrusion protrudes from one side of the base plate, wherein when H represents a height direction of the protrusion from the one side and W represents a width direction perpendicular to the height direction (H), a section taken along a W-H plane is of a rectangular shape whose opposite corners in the height direction (H) are rounded.

14 Claims, 19 Drawing Sheets

NEAR FIELD LIGHT GENERATING ELEMENT, THERMALLY ASSISTED MAGNETIC HEAD, THERMALLY ASSISTED MAGNETIC HEAD DEVICE AND THERMALLY ASSISTED MAGNETIC RECORDING/REPRODUCING APPARATUS

TECHNICAL FIELD

The present invention relates to a near-field light generating element, a thermally assisted magnetic head, a thermally assisted magnetic head device and a thermally assisted magnetic recording/reproducing apparatus.

BACKGROUND OF THE INVENTION

For increasing the recording density of magnetic recording, it is required to locally heat a magnetic recording medium and decrease the coercivity of the magnetic recording medium for facilitating recording. For local heating, it is desirable to use a near-field light.

Japanese Unexamined Patent Application Publication No. 2001-255254 and Japanese Patent Nos. 4032689 and 4104584 disclose a technology of generating a near-field light using surface plasmon with a metallic scatterer (plasmon generator in the present invention) irradiated with a light.

In generating a near-field light, the feature that the surface plasmon tends to propagate along a sharp edge in a concentrated manner should be utilized, so that in order to provide the metallic scatterer with a sharp edge, it is effective to modify its shape into a triangular prism.

On the other hand, however, since the edge tends to overheat excessively, thermal deformation of the metallic scatterer becomes a major problem.

SUMMARY OF THE INVENTION

It is an object of the present invention to provide a near-field light generating element in which a plasmon generator of the near-field light generating element has a base plate with a protrusion protruding therefrom and corners of the protrusion have a radius of curvature so that an intense near-field light can be generated while suppressing thermal deformation of the plasmon generator, a thermally assisted magnetic head, a thermally assisted magnetic head device and a thermally assisted magnetic recording/reproducing apparatus.

In order to attain the above object, a near-field light generating element according to the present invention comprises a plasmon generator. The plasmon generator has a base plate and a protrusion. The protrusion protrudes from one side of the base plate, wherein when H represents a height direction of the protrusion from the one side and W represents a width direction perpendicular to the height direction (H), a section taken along a W-H plane is of a rectangular shape whose opposite corners in the height direction (H) are rounded.

With the protrusion thus provided in the base plate, a highly intense near-field light can be generated from the near-field light generating element. This also can narrow a near-field light generating area. Moreover, the waveguide efficiency can also be improved for an incident light. As used herein, the waveguide efficiency refers to a ratio of output energy of a near-field light to input energy of an incident light.

Since the opposite corners are arcuate (with a radius of curvature R) in the W-H section of the protrusion, furthermore, thermal deformation of the opposite corners can be prevented to realize a plasmon generator which can endure long-term continuous use.

In addition, it may be configured such that one end face of the plasmon generator in a length direction (L) perpendicular to both the height direction (H) and the width direction (W) is a near-field light generating end face and the near-field light generating end face is coplanar with one end face of the base plate that is adjacent to one edge of the one side. With this configuration, the near-field light can be generated in a concentrated manner from the near-field light generating end face around the top of the protrusion in the height direction (H).

Moreover, if one end face of the protrusion in a length direction (L) perpendicular to both the height direction (H) and the width direction (W) is a near-field light generating end face and the near-field light generating end face of the protrusion protrudes by a distance X from one end face of the base plate that is adjacent to one edge of the one side, the near-field light generating position can be shifted closer to the base plate from around the top. In this case, a higher light intensity and improvement in waveguide efficiency can be achieved as compared with the above configuration where the near-field light generating end face is coplanar with one end face of the base plate that is adjacent to one edge of the one side (that is, the distance X is 0 nm).

In these configurations, the opposite corners preferably have a radius of curvature R equal to or less than 90% of half a length of the shorter one of a height $H1$ in the height direction (H) and a width $W1$ in the width direction (W) so as to prevent thermal deformation of the opposite corners in the W-H section of the protrusion more effectively. In this case, as a specific value, the radius of curvature R is preferably such that $R \geq 5$ nm, more preferably such that $5 \text{ nm} \geq R \geq 13.5 \text{ nm}$. With such a value, both the light intensity and the waveguide efficiency can be increased while preventing thermal deformation of the opposite corners in the W-H section of the protrusion.

The near-field light generating element may be configured to include an optical waveguide, wherein the plasmon generator is optically connected to the optical waveguide and the optical waveguide is opposed to the rectangular protrusion.

With the optical waveguide, an incident light can be accurately guided to the plasmon generator. Since the plasmon generator is optically connected to the optical waveguide, moreover, the incident light propagating through the optical waveguide can be evanescent-coupled to the plasmon generator, whereby a near-field light can be emitted from the plasmon generator.

In addition, the near-field light generating element may be configured to include a metal guide and an optical waveguide. In this case, preferably, the metal guide is opposed to the protrusion and optically connected to the base plate and the protrusion, while the optical waveguide is optically connected to the metal guide and located on the other side of the base plate of the plasmon generator opposite from the one side.

The near-field light generating element according to the present invention may be combined with a recording element to provide a thermally assisted magnetic head, and the thermally assisted magnetic head may be combined with a support device to provide a thermally assisted magnetic head device, and the thermally assisted magnetic head device may be combined with a magnetic recording medium to provide a magnetic recording/reproducing apparatus.

The other objects, constructions and advantages of the present invention will be further detailed below with reference to the attached drawings. However, the attached drawings show only illustrative examples.

DESCRIPTION OF THE PREFERRED EMBODIMENTS

1. Near-Field Light Generating Element

Figure 1:
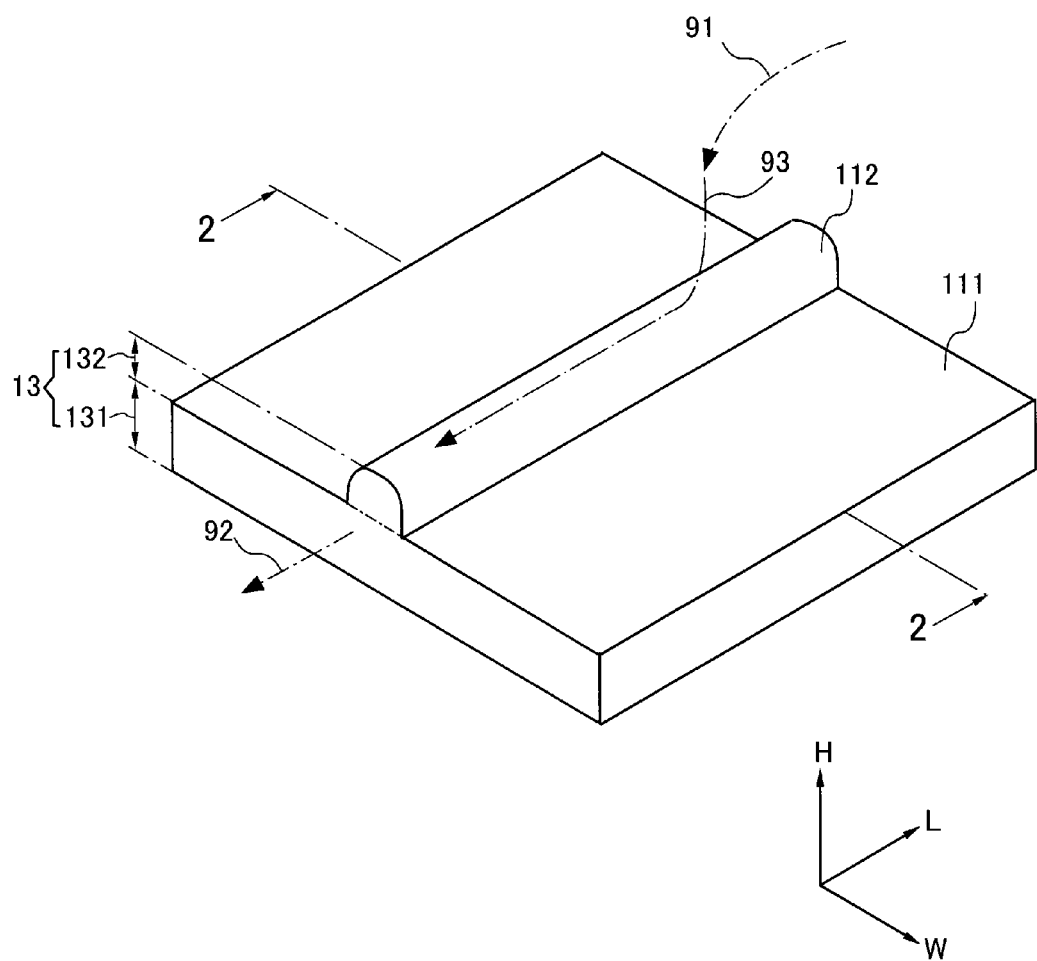
FIG. 1 is a perspective view of a plasmon generator according to the present invention.

Referring to FIG. 1, illustrated is a plasmon generator to be used in a near-field light generating element according to the present invention. The plasmon generator is configured to have a protrusion 112 protruding from one side of a base plate 111.

In FIG. 1, H represents a height direction of the protrusion 112 from the one side of the base plate 111, W represents a width direction perpendicular to the height direction (H), and L represents a length direction perpendicular to both the height direction (H) and the width direction (W). Also in FIG. 2 and the following figures, these directions are denoted by the same manner.

At first, the principle of near-field light generation in the near-field light generating element according to the present invention will be described with reference to FIG. 1. When an incident light 91 enters a propagation path of the incident light (not shown) while satisfying the conditions of total reflection, electromagnetic field (near-field) leaks to the side of the plasmon generator. This near-field propagates along the surface of the plasmon generator as an evanescent wave (also called "evanescent light") 93 to excite surface plasmon in the plasmon generator. The surface plasmon is a compressional wave of free charge on the surface of the plasmon generator and can be excited by vibrating the free charge on the surface of the plasmon generator with the evanescent wave 93 (evanescent coupling). The excited surface plasmon propagates along the surface of the plasmon generator in a direction opposite to the length direction (L) and is emitted as a near-field light 92 from a near-field light generating end face 13.

In FIG. 1, one end face of the plasmon generator in the length direction (L) is the near-field light generating end face 13. The near-field light generating end face 13 includes a near-field light generating end face 131 of the base plate 111 and a near-field light generating end face 132 of the protrusion 112.

Generally, the surface plasmon tends to propagate along a sharp edge in a concentrated manner, and therefore in the case where the protrusion 112 is provided in the base plate 111, as shown in FIG. 1, it propagates along the protrusion 112 in a concentrated manner, so that the near-field light 92 can be generated in a concentrated manner from the near-field light generating end face 132 of the protrusion 112. Thus, the near-field light 92 generating area becomes small to increase the light intensity, which makes it possible to locally heat an object. In this case, moreover, the waveguide efficiency can also be improved.

Figure 2:
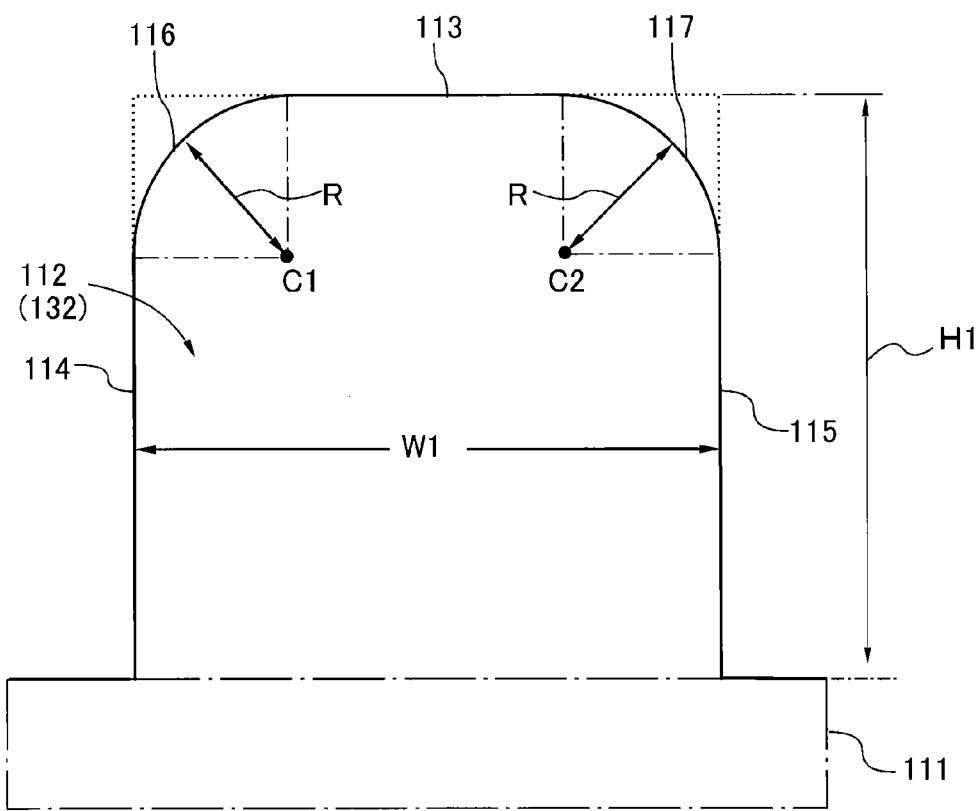
FIG. 2 is a drawing showing a W-H section of a protrusion taken along the line 2-2 in FIG. 1.
Figure 2:
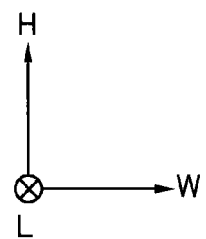

FIG. 2 shows a W-H section of the protrusion 112 taken along the line 2-2 in FIG. 1. As indicated by a solid line, the feature of the present invention resides in that opposite corners 116, 117 in the W-H section of the protrusion 112 are arcuate with a radius of curvature R. Specifically, opposite corners (dotted lines) of a rectangular shape having a width W1 and a height H1 are rounded with a radius of curvature R.

In this specification, moreover, the W-H section of the protrusion 112 includes the near-field light generating end face 132 of the protrusion 112, and the width W1 and the height H1 of the W-H section of the protrusion 112 may vary arbitrarily in the length direction (L).

With the W-H section of the protrusion 112 thus shaped, the surface plasmon can readily propagate along a top 113. As a result, the near-field light can be generated in a concentrated manner around the top 113 in the near-field light generating end face 132 of the protrusion 112, which further narrows the near-field light generating area. The near-field light generating area is smaller and the light intensity and the waveguide efficiency are higher than in the case where the W-H section of the protrusion 112 is of a triangular shape, for example.

In the case where the opposite corners 116, 117 are arcuate with a radius of curvature R, as in the present invention, moreover, thermal deformation of the opposite corners 116, 117 can be prevented effectively as compared with the case where the opposite corners 116, 117 are right-angled (with a sharp edge) as indicated by dotted lines.

Generally, since the surface plasmon has the property of propagating along a sharp edge in a concentrated manner, there is a problem that the edge portion will be excessively overheated to cause thermal deformation. In order to solve such a problem, accordingly, the sharp edges are rounded in the present invention. By rounding the sharp edges, the surface plasmon can be dispersed over the opposite corners 116, 117 and also to the top 113, thereby preventing thermal deformation of the opposite corners 116, 117. This makes it possible to provide a plasmon generator which can endure long-term continuous use.

Moreover, the arcuate opposite corners 116, 117 has two centers of curvature C1, C2 within the protrusion, wherein the radius of curvature R should be equal to or less than half a length of the shorter one of the width W1 and the height H1. This is because, with this configuration, the top 113 and opposite ends 114, 115 can be smoothly connected to each other through the opposite corners without creating any sharp edge. It should be noted that when the opposite corners 116, 117 are not configured as above, even if the opposite corners 114, 115 are arcuate, a sharp edge will be created by rough connection between the top 113 and the opposite ends 114, 115, causing the problem of thermal deformation at the edge portion.

The plasmon generator preferably is comprised of Au, Ag or an alloy containing it as a main component. Among them, preferably, an Ag alloy contains at least one element selected from the group consisting of Pd, Au, Cu, Ph and Ir.

Figure 3:
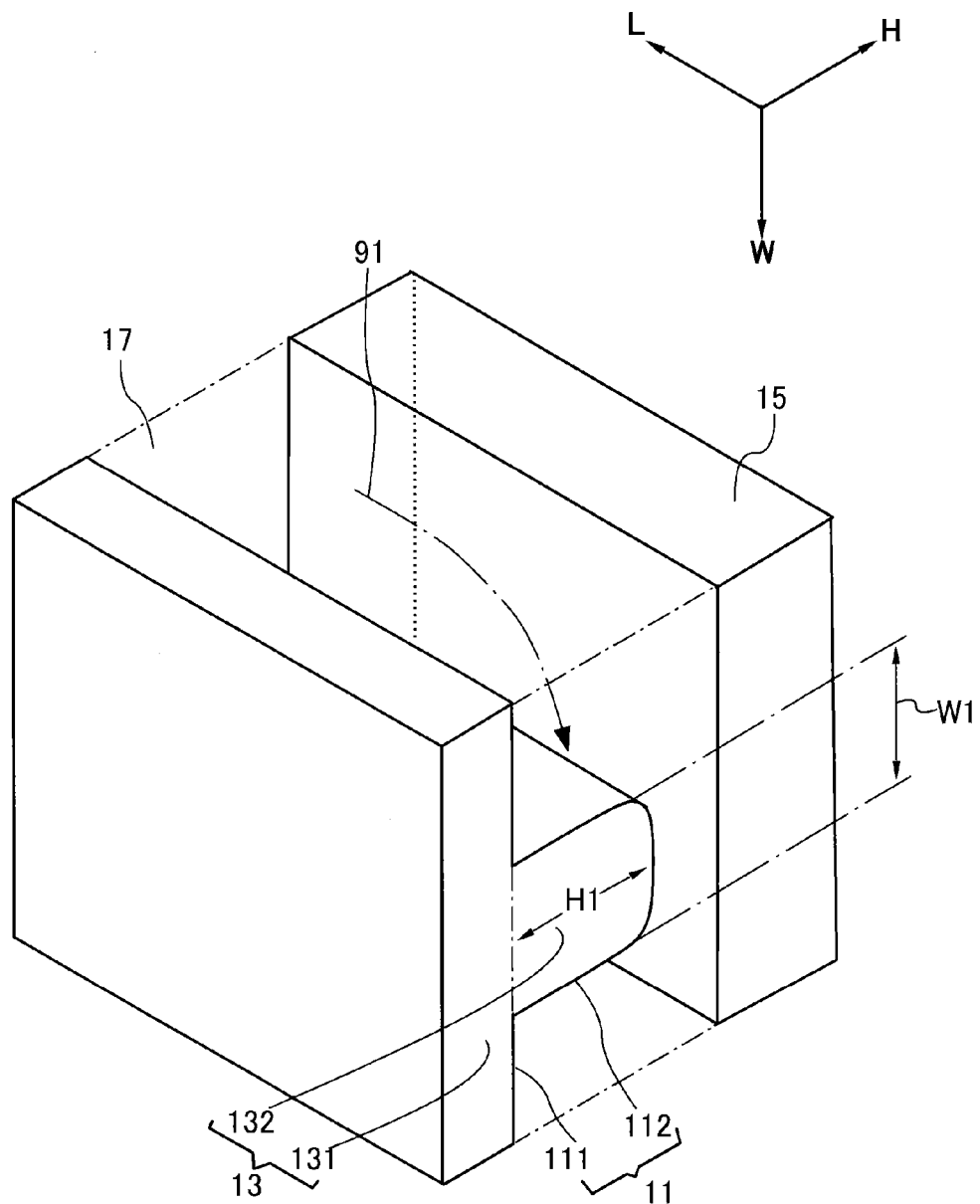
FIG. 3 is a perspective view of a near-field light generating element according to the present invention.

FIG. 3 is a perspective view showing a near-field light generating element according to the present invention. Referring to FIG. 3, the near-field light generating element is a combination of a plasmon generator 11 and an optical waveguide 15. The plasmon generator 11 is the same as shown in FIG. 1, wherein the W-H section of the protrusion 112 is of the same shape as indicated by a solid line in FIG. 2. FIG. 3 shows a relative positional relationship between the plasmon generator 11 and the optical waveguide 15 but does not limit actual sizes of the plasmon generator 11 and the optical waveguide 15.

The optical waveguide 15 for guiding the incident light 91 to the plasmon generator 11 is opposed to the protrusion 112 and optically connected to the plasmon generator 11 through an optical connection 17. Since the plasmon generator 11 is optically connected to the optical waveguide 15, the incident light 91 propagating through the optical waveguide 15 can be evanescent-coupled to the plasmon generator 11, whereby the excited surface plasmon propagates through the protrusion 112 and the near-field light is emitted from the near-field light generating end face 13.

The optical connection 17 serves to enable evanescent-coupling of the incident light 91 to the plasmon generator 11. Moreover, the optical connection 17 has a lower refractive index than the optical waveguide 15. For example, when it comprises a dielectric material and the incident light is a laser beam having a wavelength of 600 nm and the optical waveguide is comprised of $TaO_x$ (refractive index n=2.16), a clad layer may be comprised of $SiO_2$ (n=1.46) or $Al_2O_3$=1.63).

Furthermore, the optical waveguide 15 is covered with a clad layer (not shown) except for the optical connection 17. The refractive index of the clad layer is lower than the refractive index of the optical waveguide 15. With this configuration, the propagation loss of the incident light can be reduced by good optical properties of the material itself. That is, high propagation efficiency of the incident light 91 can be realized by the effect of confining the incident light 91 due to the difference in refractive index, which results in increasing the waveguide efficiency. For example, the optical waveguide 15 comprises a dielectric material. For example, when the incident light 91 has a wavelength of 600 nm and the clad layer comprises $Al_2O_3$ $_{(n=1.63)}$, the optical waveguide 15 may comprise $SiO_xN_y$ (n=1.7 to 1.85), $TaO_x$ (n=2.16), $NbO_x$ (n=2.33) or $TiO_x$ (n=2.3 to 2.55). Thus, total reflection conditions can be satisfied at all sides of the optical waveguide 15.

Figure 4:
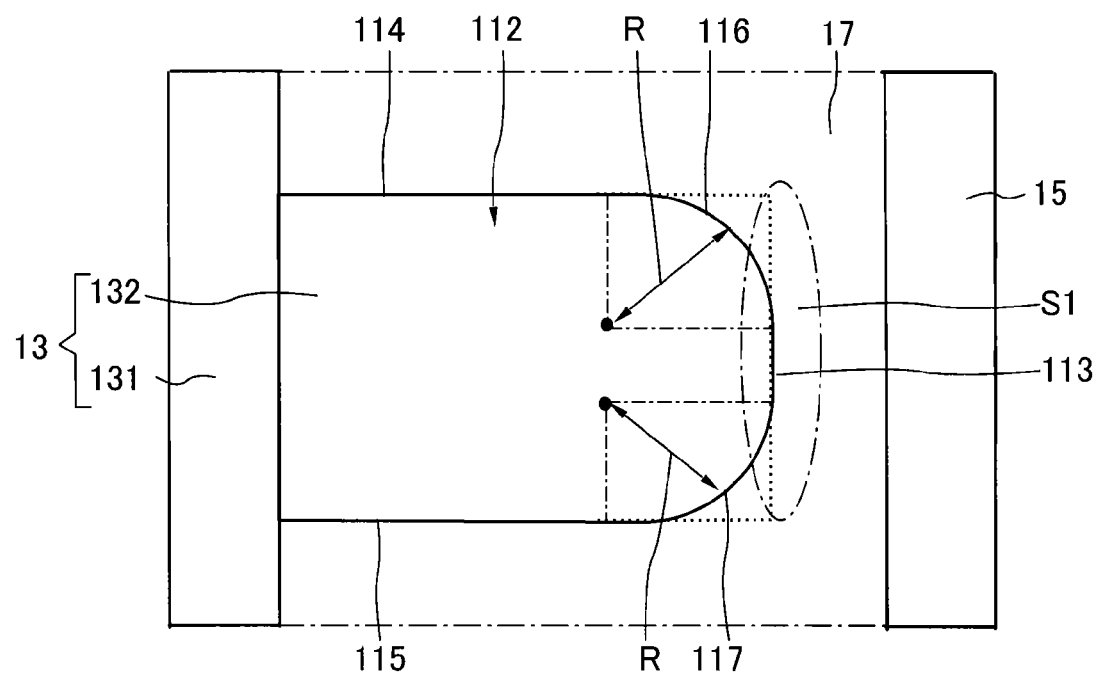
FIG. 4 is a plan view in which the near-field light generating element shown in FIG. 3 is seen from the side of a near-field light generating end face in a planar manner.
Figure 4:
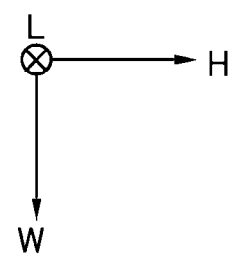

FIG. 4 is a drawing in which the near-field light generating element shown in FIG. 3 is seen from the side of the near-field light generating end face 13 in a planar manner. Since the surface plasmon tends to propagate along the top 113 of the protrusion 112, as described above, the near-field light is generated at a generating area S1 around the top 113 of the near-field light generating end face 132.

Figure 5:
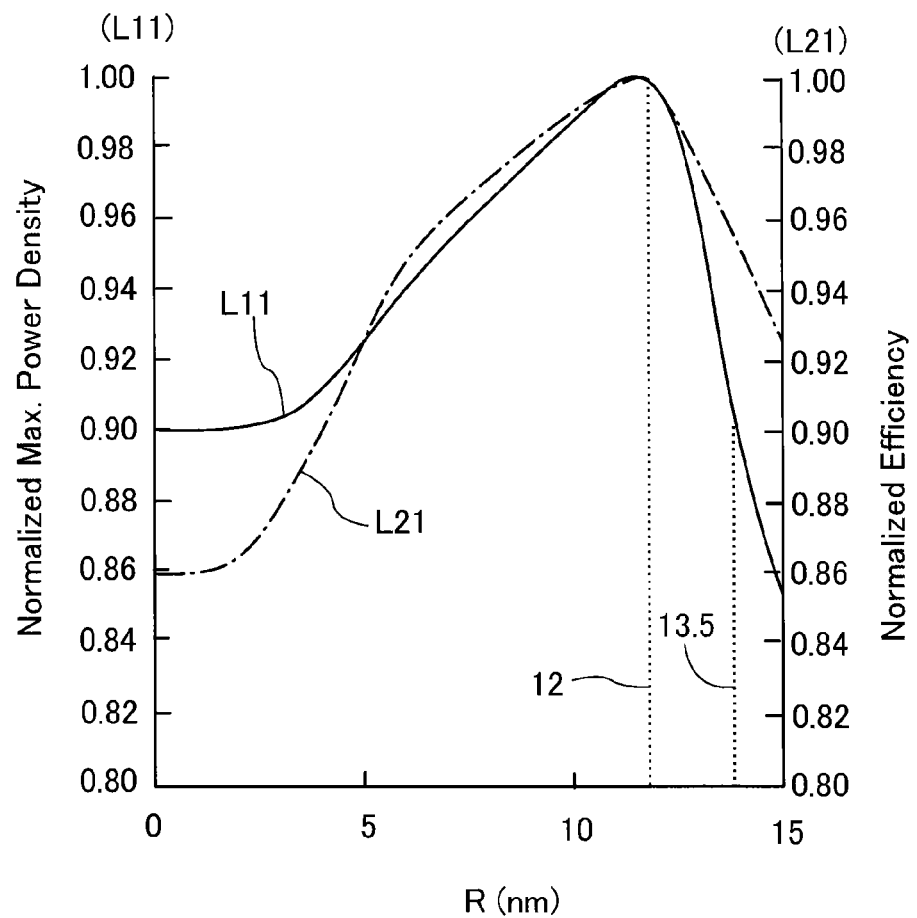
FIG. 5 is a graph showing a relationship between radius of curvature R and maximum light intensity and waveguide efficiency.

FIG. 5 is a graph showing a relationship between the radius of curvature R and the light intensity and waveguide efficiency of the near-field light generated at the generating area S1 in FIG. 4, wherein the width W1 and the height H1 of the protrusion 112 at the W-H section satisfy H1>W1 and the width W1 and the height H1 of the protrusion 112 at the near-field light generating end face 132 satisfy the relationship of W1=30 nm (<H1). In FIG. 5, the abscissa shows the radius of curvature R, the left ordinate shows the light intensity normalized with the maximum value taken as 1, and the right ordinate shows the waveguide efficiency normalized with the maximum value taken as 1. The light intensity is indicated by a solid line L11, while the waveguide efficiency is indicated by an alternate long and short dash line L21. From this, it is seen that the light intensity and the waveguide efficiency become maximum when R=12 nm. The light intensity is high in the range of R≦12.5 nm (particularly, 5 nm≦R≦13.5 nm) but drops to a low level when R>13.5 nm.

Accordingly, it is seen that as a condition for obtaining a near-field light excellent in both the light intensity and the waveguide efficiency, it is preferable that 5 nm≦R≦13.5 nm. That is, the radius of curvature R is preferably equal to or less than 90% of the width W1, and particularly, it is preferable that R=12 nm.

Figure 6:
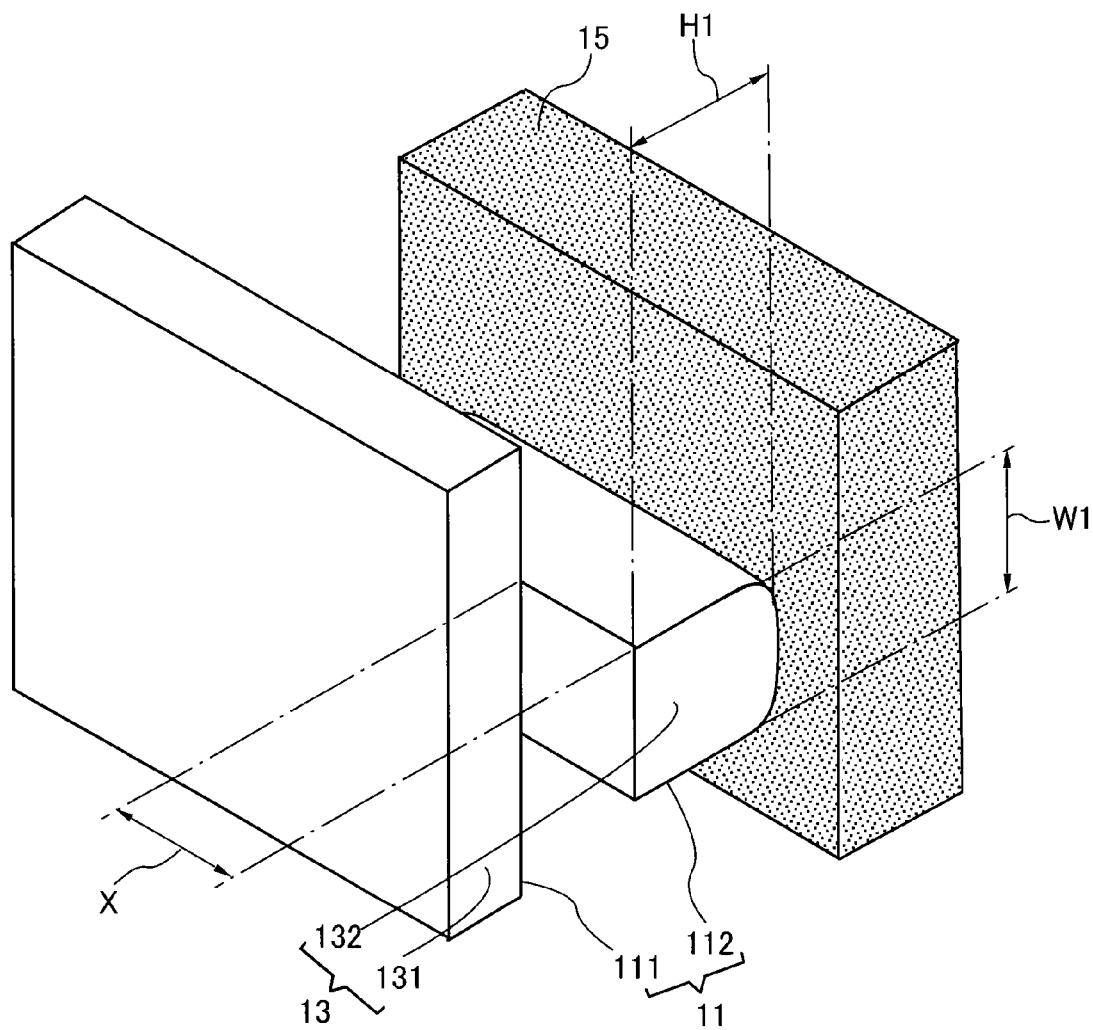
FIG. 6 is a perspective view showing another embodiment of a near-field light generating element according to the present invention.

FIG. 6 is a perspective view showing another embodiment of a near-field light generating element according to the present invention. Referring to FIG. 6, there is shown a state where the near-field light generating end face 131 of the base plate 111 is recessed from the near-field light generating end face 132 of the protrusion 112 by a distance X in the length direction (L). This state can also be expressed such that the near-field light generating end face 132 of the protrusion 112 projects by a distance X from the near-field light generating end face 131 of the base plate 111. In addition, an optical connection (not shown) is provided between the plasmon generator 11 and the optical waveguide 15. It should be noted that the same explanation as for FIG. 3 is applicable to the portions similar to those in FIG. 3.

Figure 7:
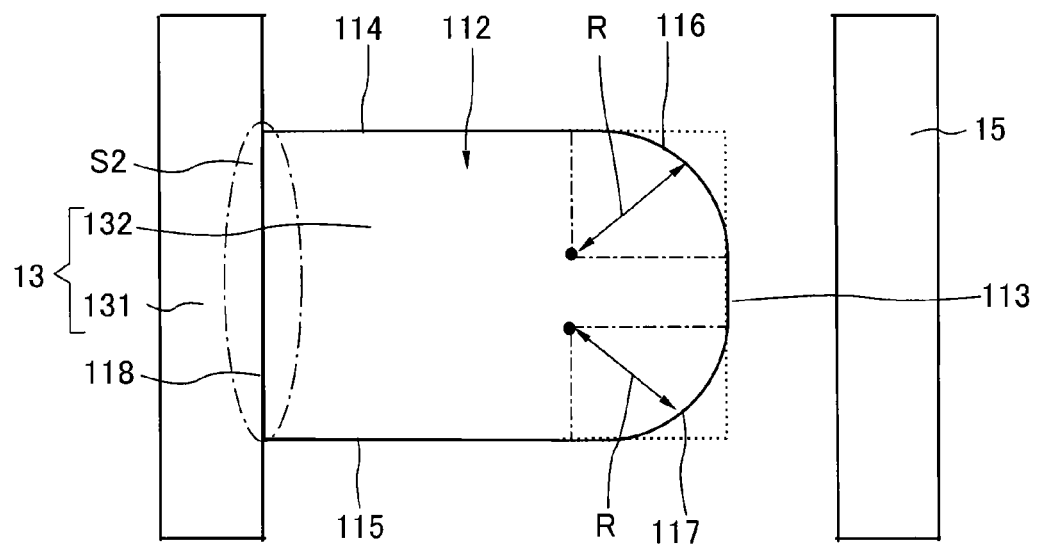
FIG. 7 is a plan view in which the near-field light generating element shown in FIG. 6 is seen from the side of a near-field light generating end face in a planar manner.
Figure 7:
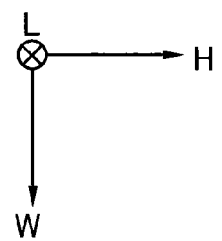

FIG. 7 is a drawing in which the near-field light generating element shown in FIG. 6 is seen from the side of the near-field light generating end face 13 in a planar manner. In FIG. 7, the near-field light can be generated at a generating area S2 around a bottom 118 of the near-field light generating end face 132 of the protrusion 112 because the base plate 111 is recessed by a distance X in FIG. 6. As compared with the near-field light generating area S1 in FIG. 4, the generating area S2 in FIG. 7 is shifted from the top 113 to the bottom 118.

Figure 8:
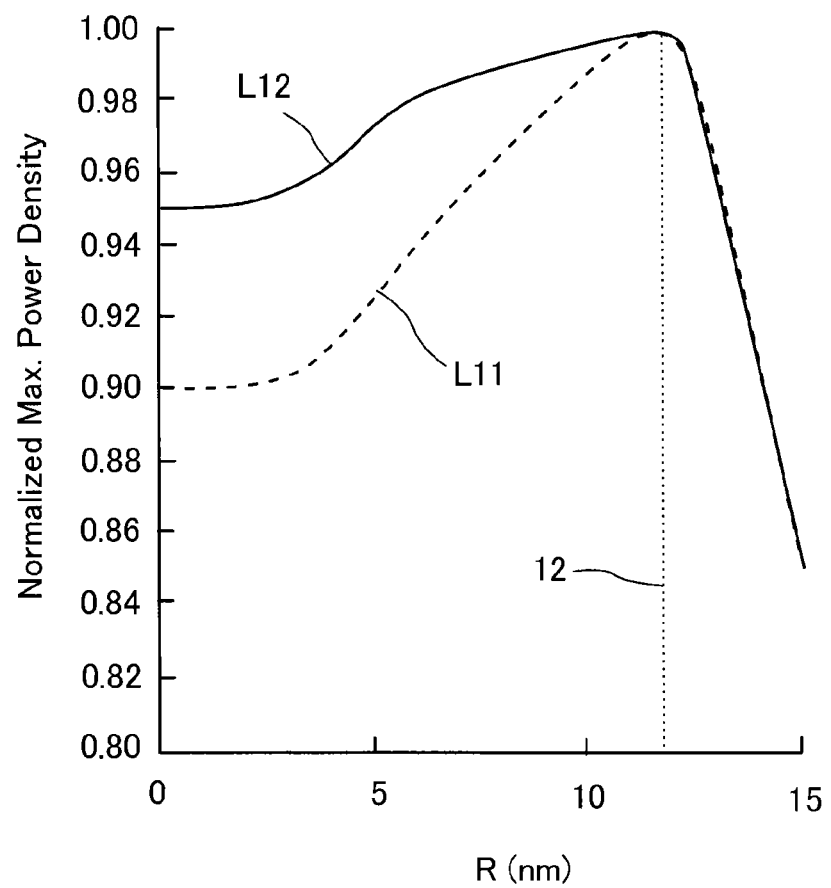
FIG. 8 is a graph showing a relationship between radius of curvature R and maximum light intensity.

FIG. 8 is a graph showing the light intensity of the near-field light generated at the generating area S2 in FIG. 7, wherein the distance X and the width W1 of the near-field light generating end face 132 of the protrusion 112 in FIG. 6 are such that X=30 nm and W1=30 nm (<H1). The abscissa shows the radius of curvature R, and the ordinate shows the light intensity normalized with the maximum value taken as 1. A solid line L12 indicates a case where X=30 nm, while a dotted line L11 indicates a case where X=0 nm (i.e., corresponding to the solid line L11 in FIG. 5).

Figure 9:
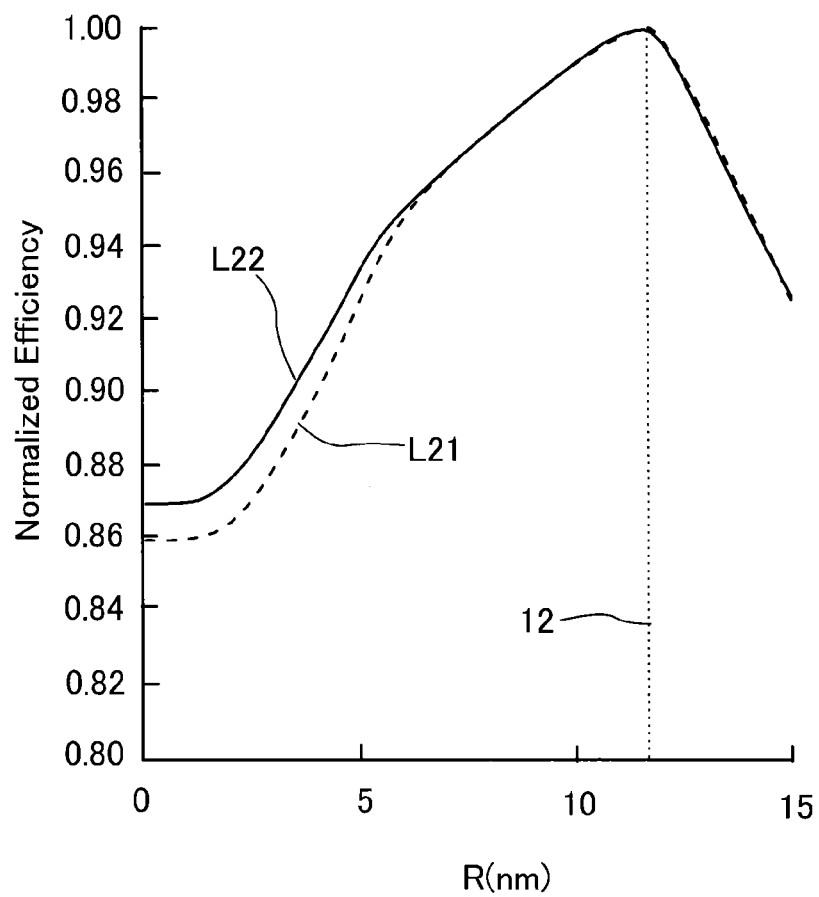
FIG. 9 is a graph showing a relationship between radius of curvature R and waveguide efficiency.

On the other hand, FIG. 9 is a graph showing the waveguide efficiency of the near-field light generated at the generating area S2 in FIG. 7, wherein the distance X and the width W1 of the near-field light generating end face 132 of the protrusion 112 in FIG. 6 are such that X=30 nm and W1=30 nm (<H1). The abscissa shows the radius of curvature R, and the ordinate shows the waveguide efficiency normalized with the maximum value taken as 1. A solid line L22 indicates a case where X=30 nm, while a dotted line L21 indicates a case where X=0 nm (i.e., corresponding to the alternate long and short dash line L21 in FIG. 5).

Referring to FIGS. 8 and 9, the same tendency is seen in both X=0 nm and X=30 nm, wherein the maximum value is obtained around R=12 nm. It is also seen that in the range of $0 \leq nm \ R \leq 12$ nm, the difference from the maximum value is smaller in the case of X=30 nm than in the case of X=0 nm.

It should be noted that the same explanation as for FIGS. 5, 8 and 9 is also applicable to the case where the width W1 and the height H1 of the section of the protrusion satisfy the relationship of $W1 \geq H1$ (=30 nm).

Figure 10:
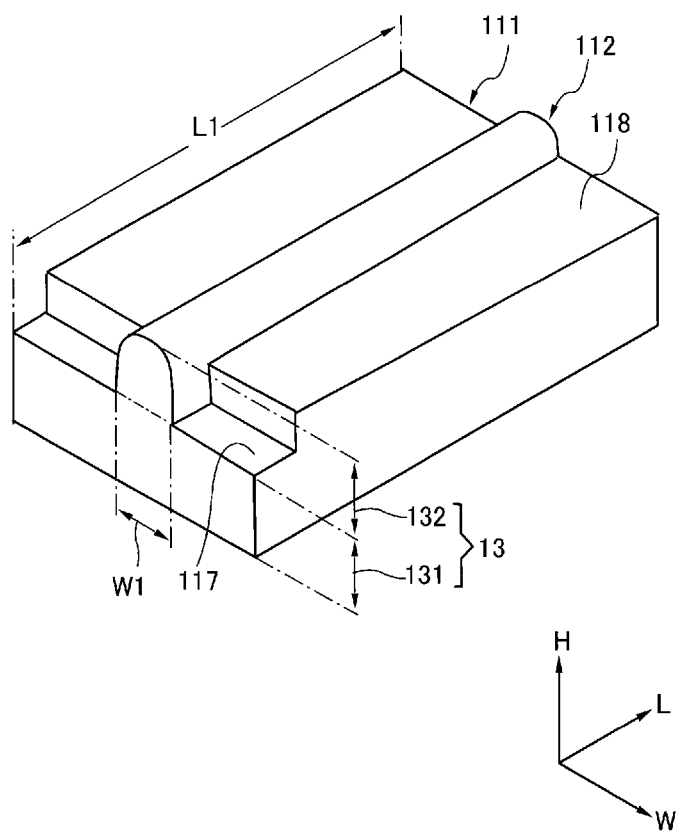
FIG. 10 is a perspective view showing another embodiment of a plasmon generator according to the present invention.

FIG. 10 shows another embodiment of a plasmon generator according to the present invention. The portions similar to those in FIG. 1 are denoted by the same reference symbols. One side of the base plate 111 is composed of a low-level portion 117 and a high-level portion 118 rising perpendicularly from the low-level portion 117. The protrusion 112 protrudes from the one side of the base plate 111 over the low-level portion 117 and the high-level portion 118. L1 represents a length of the plasmon generator as measured in the length direction (L). End faces of the protrusion 112 and the base plate 111 opposite to the length direction (L) serve as the near-field light generating end face 13. The near-field light generating end face 13 includes the near-field light generating end face 131 of the base plate 111 and the near-field light generating end face 132 of the protrusion 112. The H—W section of the protrusion 112 is of the same shape as indicated by the solid line in FIG. 2.

Moreover, the plasmon generator preferably is comprised of Au, Ag or an alloy containing it as a main component. Among them, preferably, an Ag alloy contains at least one element selected from the group consisting of Pd, Au, Cu, Rh and Ir.

Figure 11:
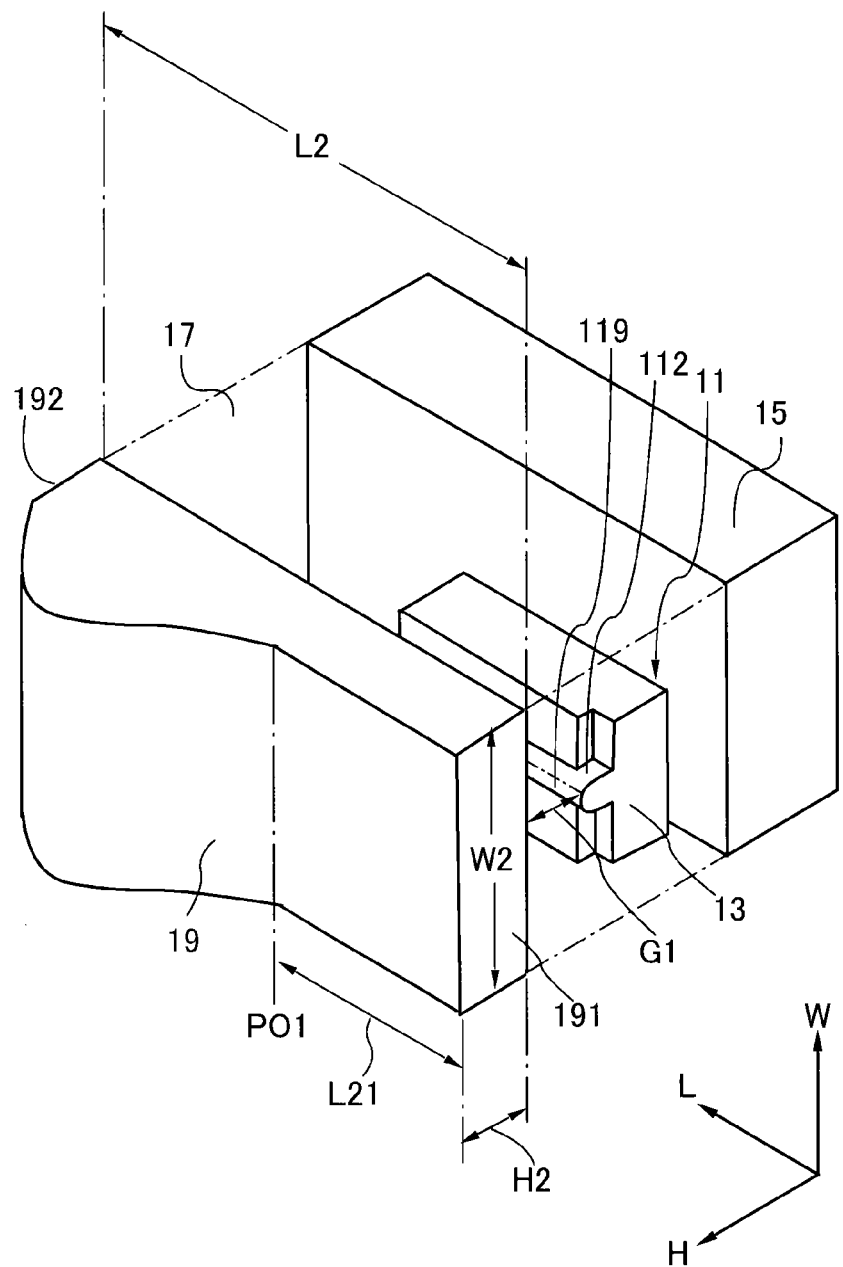
FIG. 11 is a perspective view showing another embodiment of a near-field light generating element according to the present invention.

FIG. 11 is a perspective view showing another embodiment of a near-field light generating element according to the present invention. Referring to FIG. 11, the near-field light generating element is a combination of the plasmon generator 11, the optical waveguide 15 and a metal guide 19. The plasmon generator is the same as shown in FIG. 10. In the near-field light generating element, the optical waveguide 15, the plasmon generator 11 and the metal guide 19 are arranged in order in the height direction (H) and a top surface 119 of the protrusion 112 is opposed to the metal guide 19 with a gap G1. Moreover, the plasmon generator 11 is the same as shown in FIG. 10.

The metal guide 19 is optically connected to the plasmon generator 11 and the optical waveguide 15 through the optical connection 17. In addition, the metal guide 19 has a length L2 as measured in the length direction (L) and a width W2 as measured in the width direction (W). As measured in the height direction (H), moreover, the metal guide 19 has a constant thickness H2 from one end face 191 to a position PO1 over a distance L21, but the portion from the position PO1 to the other end face 192 may be designed to have a thickness that is larger than the thickness H2.

The optical connection 17 has a lower refractive index than the optical waveguide 15. For example, when it comprises a dielectric material and the incident light is a laser beam having a wavelength of 600 nm and the optical waveguide is comprised of $TaO_x$ (refractive index n=2.16), a clad layer may be comprised of $SiO_2$ (n=1.46) or $Al_2O_3$ (n=1.63).

In the case where the near-field light generating element is configured as in FIG. 11, since the waveguide efficiency can be improved as compared with the near-field light generating elements shown in FIGS. 3 and 6, the output power of the incident light can be reduced.

It should be noted that FIG. 11 shows a relative positional relationship among the plasmon generator 11, the optical waveguide 15 and the metal guide 19 but does not limit actual sizes of the plasmon generator 11, the optical waveguide 15 and the metal guide 19.

Figure 12:
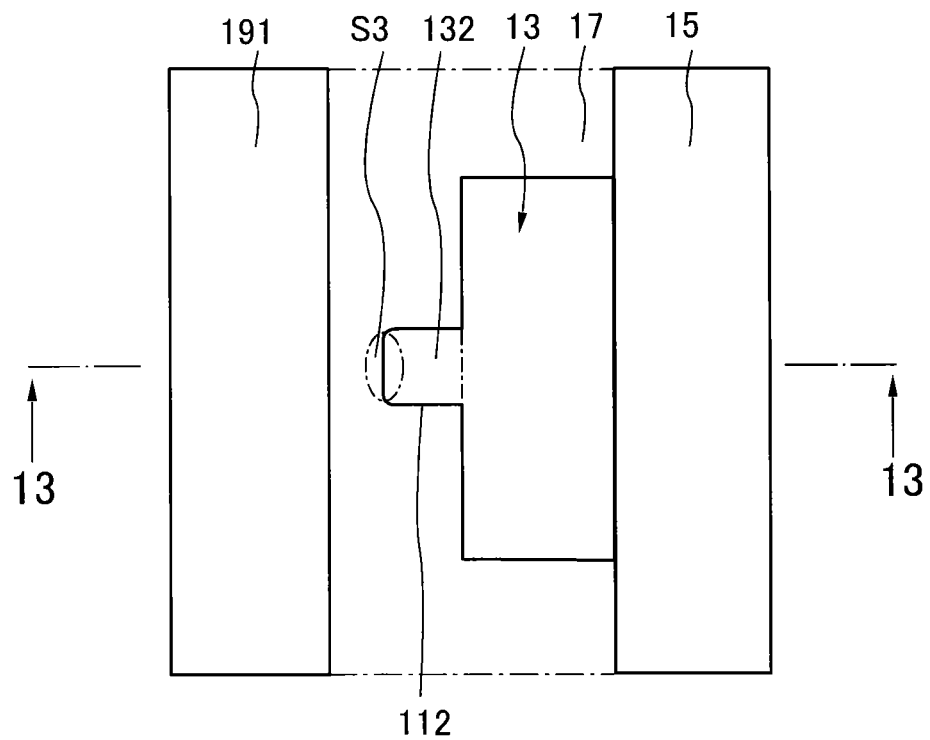
FIG. 12 is a plan view in which the near-field light generating element shown in FIG. 11 is seen from the side of a near-field light generating end face in a planar manner.
Figure 12:
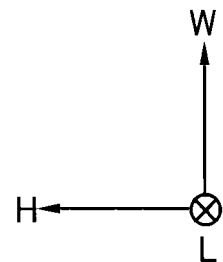
Figure 13:
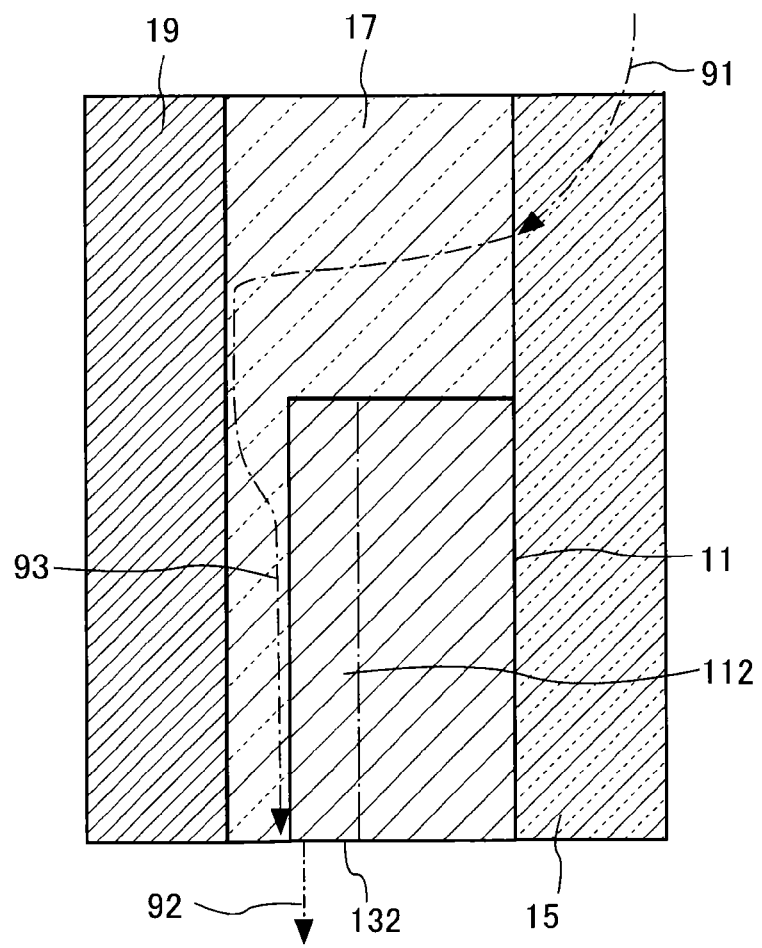
FIG. 13 is a sectional view take along the line 13-13 in FIG. 12.

FIG. 12 is a plan view in which the near-field light generating element shown in FIG. 11 is seen from the side of the near-field light generating end face 13. FIG. 13 is a sectional view take along the line 13-13 in FIG. 12.

Referring to FIG. 12, the near-field light is generated at a generating area S3 around the top of the protrusion 112 in the height direction (H) in the near-field light generating end face 132 of the near-field light generating end face 13. Referring to FIG. 13, moreover, the incident light 91 propagating through the optical waveguide 15 leaks out as a near field from the optical waveguide 15 to the optical connection 17. This near field passes through the optical connection 17 and reaches the metal guide 19 as the evanescent light 93. Furthermore, the evanescent light 93 propagates along the surface of the metal guide 19, passes through the optical connection 17 once again and then propagates along the surface of the protrusion 112 of the plasmon generator 11. Then, the evanescent light 93 is evanescent-coupled to the protrusion 112 to excite surface plasmon in the plasmon generator 11. The excited surface plasmon propagates through the protrusion 112 and is emitted as the near-field light 92 from the near-field light generating end face 132 of the protrusion 112.

Specific dimensions in FIGS. 10 and 11 may be such that G1=25 nm, L2=1.2 μm, W2=150 nm, L21=50 nm for the metal guide, L1=100 nm, W1=35 nm for the plasmon generator.

Figure 14:
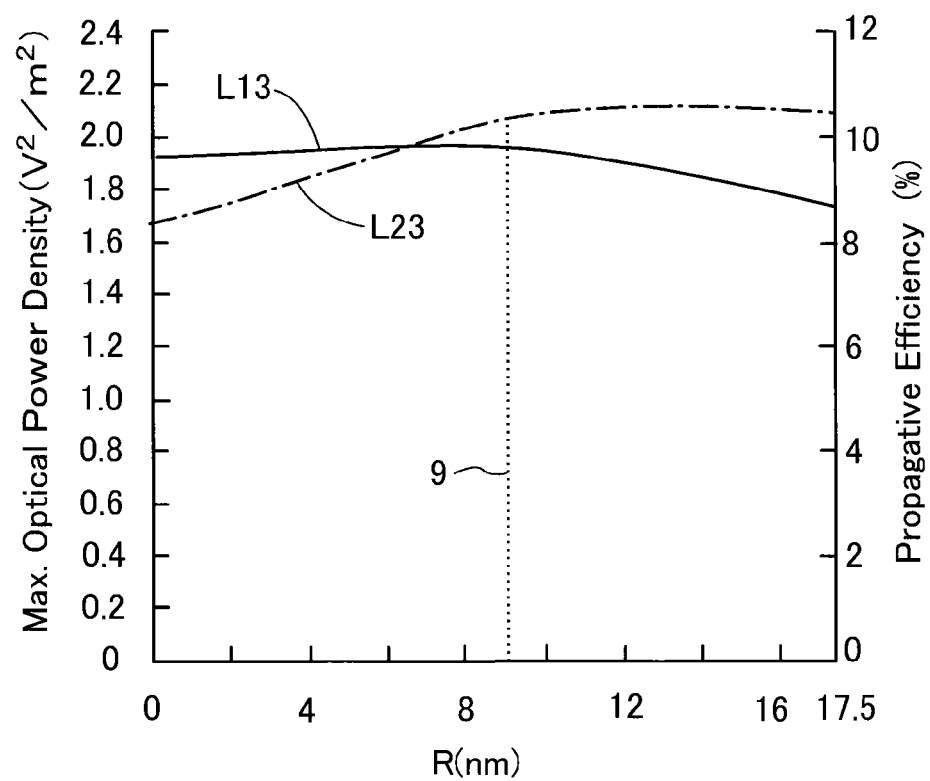
FIG. 14 is a graph showing a relationship between radius of curvature R and maximum light intensity and waveguide efficiency.

With such specific dimensions, the maximum optical power density and waveguide efficiency were measured by varying the radius of curvature R at the opposite corners of the W-H section of the protrusion 112, and FIG. 14 shows their results. In FIG. 14, the abscissa shows the radius of curvature R, the left ordinate shows the maximum optical power density, and the right ordinate shows the waveguide efficiency. The maximum optical power density is indicated by a solid line L13, while the waveguide efficiency is indicated by an alternate long and short dash line L23. Referring to FIG. 14, the maximum optical power density and the waveguide efficiency become maximum when the radius of curvature R=9 nm.

2. Thermally Assisted Magnetic Head

Figure 15:
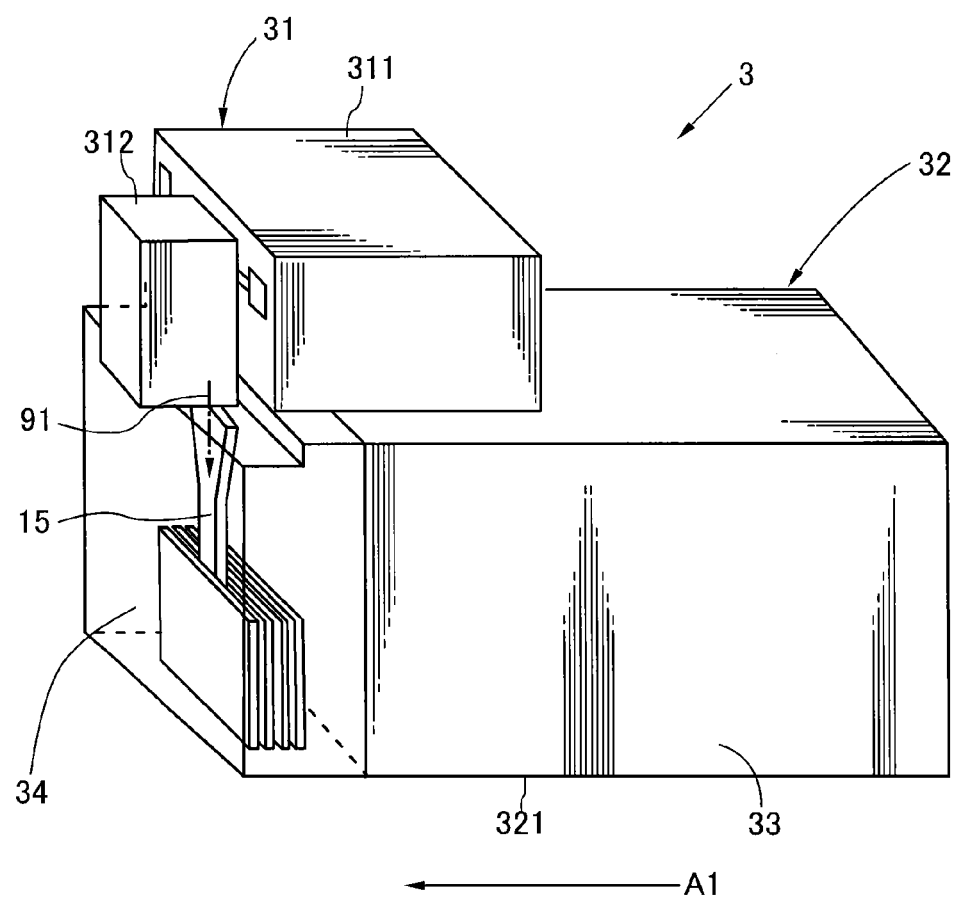
FIG. 15 is a perspective view showing the appearance of a thermally assisted magnetic head according to the present invention.
Figure 16:
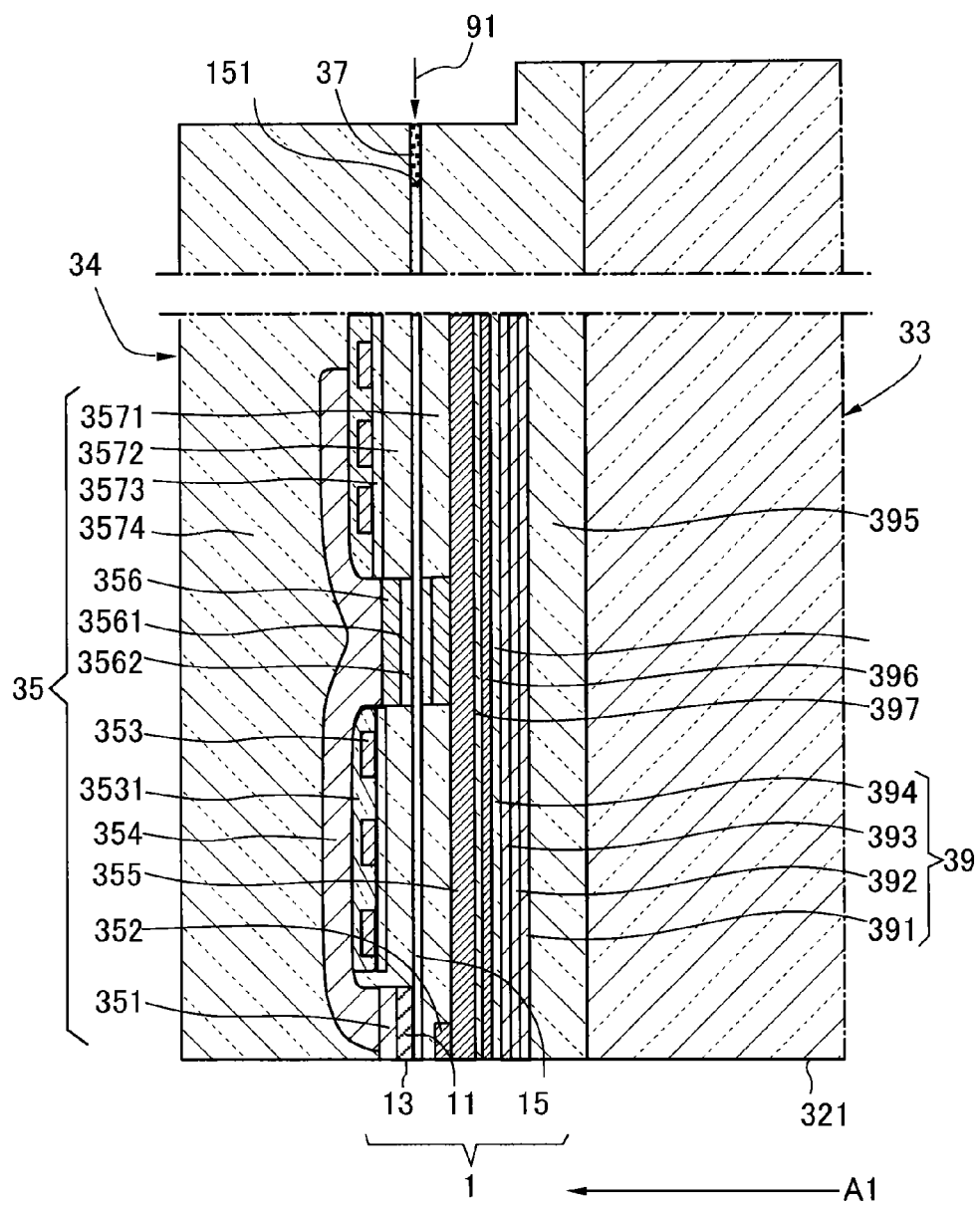
FIG. 16 is a partially omitted sectional side view of FIG. 15.

The present invention also discloses a thermally assisted magnetic head. The thermally assisted magnetic head includes the foregoing near-field light generating element. FIG. 15 shows the appearance of the thermally assisted magnetic head according to the present invention. FIG. 16 is a partially omitted sectional side view of FIG. 15, schematically showing a configuration of a head element part and its surroundings. The thermally assisted magnetic head is to be used in combination with a rapidly spinning magnetic recording medium such as a hard disk, and thermally assisted magnetic heads of this type are generally called "floating-type". Hereinbelow, the thermally assisted magnetic head according to the present invention will be described with reference to FIGS. 15 and 16.

A thermally assisted magnetic head 3 comprises a slider 32 and a light source unit 31. The slider 32 has a slider substrate 33 and a head element part 34, wherein the head element part 34 is located at a trailing-side end of the slider substrate 33 as seen in an airflow direction A1 in a medium-facing surface 321 of the slider 32. The head element part 34 includes a near-field light generating element 1, a recording element 35 and a reproducing element 39. The near-field light generating element 1 includes the plasmon generator 11 and the optical waveguide 15. The plasmon generator 11 has the near-field light generating end face 13. The near-field light generating element 1 may adopt the structures shown in FIGS. 3, 6 and 11 to include an optical connection and a metal guide.

The slider 32 comprises $Al_2O_3$—TiC or the like. The medium-facing surface 321 is an air bearing surface (ABS) and geometrically shaped (omitted in the drawings) so as to control floating characteristics.

The near-field light generating element 1, the recording element 35 and the reproducing element 39 constituting the head element part 34 are stacked on the trailing side of the slider substrate 33, which is the side having an air outflow end, by using high-precision patterning technologies including a photolithography process and covered with an insulating protective film such as alumina. Typically, the recording element 35 has a magnetic circuit and a magnetic pole structure suitable for perpendicular magnetic recording.

The near-field light generating element 1 emits the incident light 91 as a near-field light from the near-field light generating end face 13 laying in the medium-facing surface 321 of the head element part 34. A magnetic recording layer of a magnetic recording medium can be heated by the near-field light.

The recording element 35 is disposed adjacent the near-field light generating element 1 so as to perform magnetic recording on the magnetic recording layer whose coercivity has been lowered by heating with the near-field light.

The reproducing element 39 may be a current-in-plane giant magneto-resistance (CIP-GMR) element, a current-perpendicular-to-plane giant magneto-resistance (CPP-GMR) element or a tunneling magneto-resistance (TMR) element.

The light source unit 31 comprises a laser diode chip (hereinafter referred to as LD chip) 312 and a holder 311 supporting it and is disposed on a back surface of the slider 32 opposite from the ABS 321. The LD chip 312 is optically connected to the waveguide 15. The LD chip 312 has a laser diode within. The laser diode may be one from which a laser beam having a wavelength within the range of 375 nm to 1.7 µm can be emitted as the incident light 91. Specifically, it may be an InP-based, GaAs-based or GaN-based laser diode, for example.

At one end face, the holder 311 is joined to the back surface of the slider 32, for example, through an adhesive or solder. In general, the holder 311 is provided with a monitor for monitoring and controlling the intensity of the incident light 91 (laser beam) emitted from the laser diode of the LD chip 312 or the like.

The reproducing element 39 includes an MR stack 391, a lower shield layer 392, an upper shield layer 393 and a reproducing element insulating layer 394 and is formed on a foundation layer 395 comprising an insulating material such as $Al_2O_3$. The MR stack 391 is a magneto-sensitive part which senses a signal magnetic field by using the MR effect.

On the other hand, the recording element 35 includes a main pole 351, a leading shield 352, a write coil layer 353, an upper yoke layer 354, a lower yoke layer 355 and a coil insulating layer 3531. The main pole 351 comprises a soft magnetic material. Examples of the soft magnetic material include alloy materials such as FeNi, FeCo, FeCoNi, FeN and FeZrN.

On insulating layers 3571 to 3573 comprising an insulating material such as $Al_2O_3$, the write coil layer 353 is formed to pass through at least between the upper yoke layer 354 and the lower yoke layer 355 for every turn and wound about a back contact 356. In the above, for example, the write coil layer 353 is covered with the coil insulating layer 3531 comprising a heat-cured insulating material such as photoresist, thereby providing electrical insulation between the write coil layer 353 and the upper yoke layer 354. Although formed as a single layer in the present embodiment, the write coil layer 353 may have two or more layers or may be a helical layer. Moreover, the number of turns is not limited and may be set to 2 to 7 turns, for example.

The back contact 356 has a through hole 3561, and the optical waveguide 15 and a through hole insulating layer 3562 covering the optical waveguide 15 extend through the through hole 3561.

The leading shield 352 is located on a leading side of the main pole 351 and magnetically connected to the main pole 351. The leading shield 352 serves the function of taking in a recording magnetic field spreading from the main pole 351, wherein effective magnetic field gradient increases with an increase in recording magnetic field gradient, which results in increasing recording density. The leading shield 352 preferably comprises NiFe or CoNiFe having a high saturation magnetic flux density or an iron-based alloy material similar to that of the main pole 351.

After the spot size has been converted by a spot size convertor 37, the incident light 91 from the light source unit 31 enters a light-receiving end face 151 of the optical waveguide 15 and propagates through the optical waveguide 15. The optical waveguide 15 extends from the light-receiving end face 151, through the through hole 3561 provided in the back contact 356, to an end face of the head.

The plasmon generator 11 converts the incident light 91 having propagated through the optical waveguide 15 to a near-field light and emits the near-field light from the near-field light generating end face 13.

Moreover, an inter-element shield layer 396 sandwiched between the insulating layers 394, 397 is disposed between the reproducing element 39 and the lower yoke layer 355. The inter-element shield layer 396 can comprise a soft magnetic material and serves to shield the reproducing element 39 against a magnetic field generated from the recording element 35.

3. Thermally Assisted Magnetic Head Device

The present invention also discloses a thermally assisted magnetic head device. The thermally assisted magnetic head device includes a thermally assisted magnetic head and a head support device. Head support devices are designed to support the head in such a manner as to permit rolling and pitching of the head and include an HGA (head gimbal assembly) and an HAA (head arm assembly).

Figure 17:
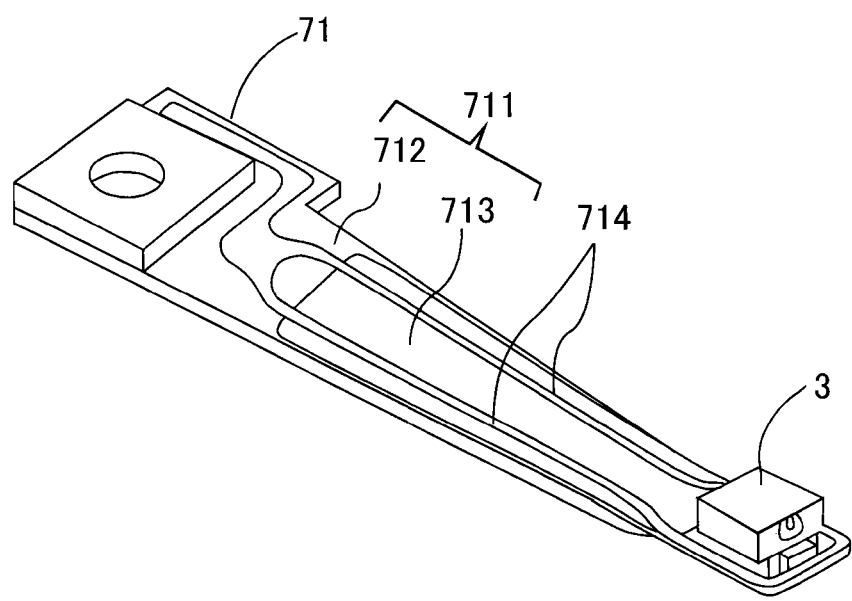
FIG. 17 is a perspective view of a head gimbal assembly with a thermally assisted head according to the present invention.

FIG. 17 is a perspective view of an HGA according to the present invention. Referring to FIG. 17, the HGA includes the thermally assisted magnetic head 3, a head support device (gimbal) 71 and a suspension 711. The suspension 711 has a load beam 712 and a flexure 713. The flexure 713 is formed from a thin leaf spring and attached at one side to the load beam 712. The thermally assisted magnetic head 3 is attached to the other side of the flexure 713. The thermally assisted magnetic head 3 is attached to one side of the flexure 713 by means of an adhesive or the like. The thermally assisted magnetic head 3 is the same as shown in FIGS. 15 and 16, and a flexible cable part 714 or the like is connected to it.

Figure 18:
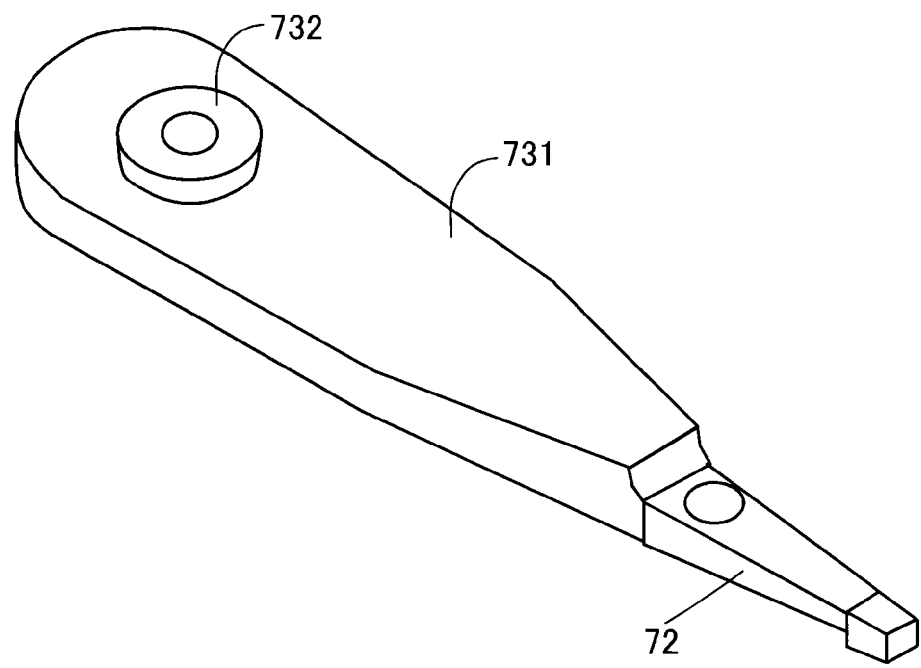
FIG. 18 is a perspective view of a head arm assembly with a thermally assisted head according to the present invention.

FIG. 18 is a perspective view of an HAA according to the present invention. Referring to FIG. 18, the HAA includes an HGA 72 and an arm 731. The arm 731 is integrally formed using a suitable non-magnetic metallic material such as aluminum alloy. The arm 731 has an attachment hole 732. HGA 72 is the same as shown in FIG. 17 and has one end secured to the arm 731, for example, with a ball connecting structure.

4. Thermally Assisted Magnetic Recording/Reproducing Apparatus

Figure 19:
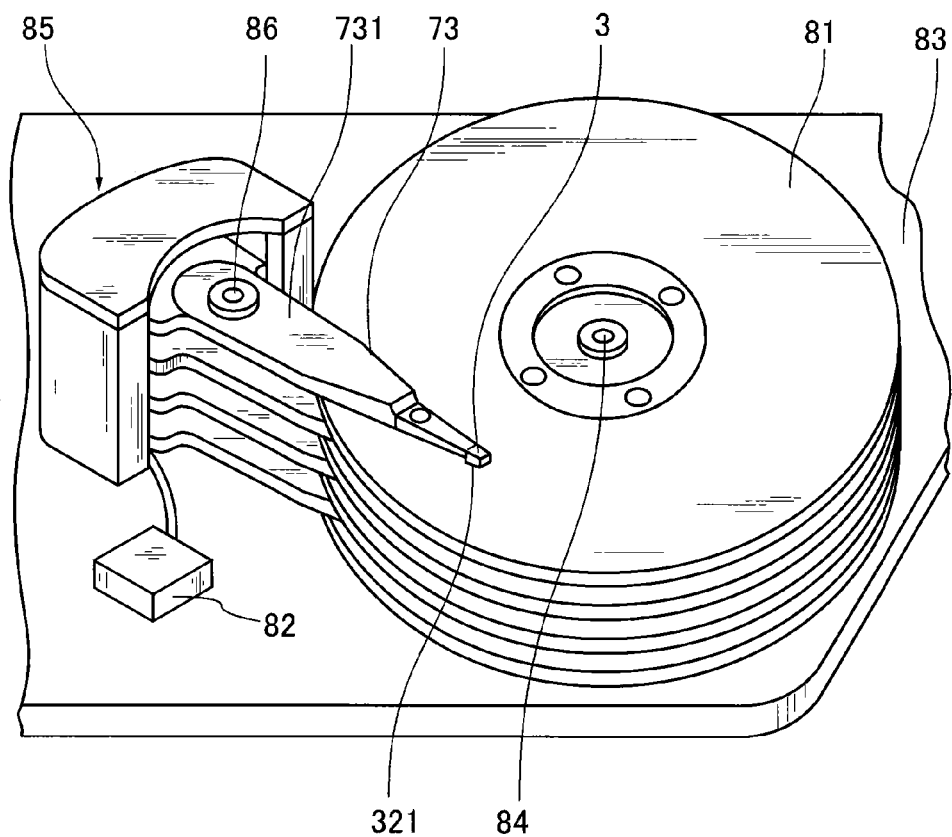
FIG. 19 is perspective view of a thermally assisted magnetic recording/reproducing apparatus according to the present invention.

The present invention further discloses a thermally assisted magnetic recording/reproducing apparatus. FIG. 19 is a perspective view of a thermally assisted magnetic recording/reproducing apparatus according to the present invention and shows a typical structure of a thermally assisted magnetic recording/reproducing apparatus. This thermally assisted magnetic recording/reproducing apparatus is, for example, a hard disk drive.

Referring to FIG. 19, the thermally assisted magnetic recording/reproducing apparatus includes HAA 73 and magnetic recording media 81. In the thermally assisted magnetic recording/reproducing apparatus, for example, the magnetic recording media 81 and the HAA 73 are provided within a case 83.

The magnetic recording media 81 are rotatable about a spindle motor 84 which is fixed to the case 83. The HAA 73 are the same as shown in FIG. 18, and the arms 731 are connected to an assembly carriage 85 and pivotable about a pivot bearing 86 which is fixed to the case 83. Furthermore, the HAA 73 has the thermally assisted head 3, and this thermally assisted magnetic head 3 is the same as shown in FIGS. 15 and 16.

The assembly carriage 85 includes, for example, a driving source such as a voice coil motor. For example, this thermally assisted magnetic recording/reproducing apparatus is of the type in which a plurality of the arms 731 are integrally pivotable about the pivot bearing 86. In FIG. 19, the case 83 is shown in a partially cut-away state, making it easy to see the internal structure of the thermally assisted magnetic recording/reproducing apparatus.

When the magnetic recording medium 81 rotates for recording or reproducing information, the thermally assisted magnetic head 3 takes off from the recording surface of the magnetic recording medium 81 utilizing an air flow generated between the recording surface of the magnetic recording medium 81 and the ABS 321 and then performs magnetic recording or reproducing operations. Moreover, the thermally assisted magnetic head 3 is connected to a control circuit 82, and the control circuit 82 controls magnetic recording and reproducing operations with the magnetic recording medium 81.

The present invention has been described in detail above with reference to preferred embodiments. However, obviously those skilled in the art could easily devise various modifications of the invention based on the technical concepts underlying the invention and teachings disclosed herein.

What is claimed is:

1. A near-field light generating element comprising a plasmon generator, the plasmon generator having a base plate and a protrusion, the protrusion protruding from one side of the base plate, wherein when H represents a height direction of the protrusion from the one side and W represents a width direction perpendicular to the height direction (H), a section taken along a W-H plane is of a rectangular shape whose opposite corners in the height direction (H) are rounded.

2. The near-field light generating element of claim 1, wherein one end face of the plasmon generator in a length direction (L) perpendicular to both the height direction (H) and the width direction (W) is a near-field light generating end face, and the near-field light generating end face is coplanar with one end face of the base plate that is adjacent to one edge of the one side.

3. The near-field light generating element of claim 1, wherein the opposite corners have a radius of curvature R equal to or less than 90% of half a length of the shorter one of a height H1 in the height direction (H) and a width W1 in the width direction (W).

4. The near-field light generating element of claim 3, wherein the radius of curvature R is equal to or greater than 5 nm.

5. The near-field light generating element of claim 4, wherein the radius of curvature R is from 5 nm to 13.5 nm.

6. The near-field light generating element of claim 1, wherein one end face of the protrusion in a length direction (L) perpendicular to both the height direction (H) and the width direction (W) is a near-field light generating end face, and the near-field light generating end face protrudes a distance X from one end face of the base plate that is adjacent to one edge of the one side.

7. The near-field light generating element of claim 6, wherein the opposite corners have a radius of curvature R equal to or less than 90% of half a length of the shorter one of a height H1 in the height direction (H) and a width W1 in the width direction (W).

8. The near-field light generating element of claim 7, wherein the radius of curvature R is equal to or greater than 5 nm.

9. The near-field light generating element of claim 8, wherein the radius of curvature R is from 5 nm to 13.5 nm.

10. The near-field light generating element of claim 1 including an optical waveguide, wherein the plasmon generator is optically connected to the optical waveguide, and the optical waveguide is opposed to the rectangular protrusion.

11. A thermally assisted magnetic head device comprising a thermally assisted magnetic head and a head support device, the thermally assisted magnetic head being the thermally assisted magnetic head of claim 10, the head support device supporting the thermally assisted magnetic head.

12. The near-field light generating element of claim 1 including a metal guide and an optical waveguide, wherein the metal guide is opposed to the protrusion and optically connected to the base plate and the protrusion, and the optical waveguide is optically connected to the metal guide and located on the other side of the base plate of the plasmon generator opposite from the one side.

13. A thermally assisted magnetic recording/reproducing apparatus comprising a thermally assisted magnetic head device and a magnetic recording medium, the thermally assisted magnetic head device being the thermally assisted magnetic head device of claim 12 and capable of performing magnetic recording and reproducing of magnetic record with the magnetic recording medium.

14. A thermally assisted magnetic head comprising a recording element and a near-field light generating element, the recording element having a recording magnetic pole, the near-field light generating element being the near-field light generating element of claim 1.

* * * * *